United States Patent [19]

Harigaya et al.

[11] Patent Number: 5,495,342
[45] Date of Patent: Feb. 27, 1996

[54] VIDEO SIGNAL RECORDING APPARATUS WITH INTERVAL RECORDING MODE

[75] Inventors: Isao Harigaya, Kanagawa; Susumu Kozuki, Tokyo, both of Japan

[73] Assignee: Canon Kabushiki Kaisha, Tokyo, Japan

[21] Appl. No.: 426,461

[22] Filed: Apr. 19, 1995

Related U.S. Application Data

[63] Continuation of Ser. No. 267,835, Jun. 28, 1994, abandoned, which is a continuation of Ser. No. 892,285, Jun. 2, 1992, abandoned.

[30] Foreign Application Priority Data

Jun. 6, 1991 [JP] Japan ................................ 3-134943

[51] Int. Cl.⁶ .................................................... H04N 5/76
[52] U.S. Cl. .................... 358/335; 358/906; 358/909.1; 354/267.1; 348/207
[58] Field of Search ..................... 358/335, 906, 358/909.1; 348/207, 220, 239, 294, 295, 296; 354/217, 267.1; 360/33.1; H04N 5/76, 5/225

[56] References Cited

U.S. PATENT DOCUMENTS

| | | | |
|---|---|---|---|
| 4,546,390 | 10/1985 | Konishi et al. | 360/10.3 |
| 4,714,963 | 12/1987 | Vogel | 358/909 |
| 4,714,966 | 12/1987 | Saito et al. | 358/906 |
| 4,800,448 | 1/1989 | Kaneko et al. | 360/35.1 |
| 4,825,324 | 4/1989 | Miyake et al. | 360/35.1 |
| 4,982,291 | 1/1991 | Kurahashi et al. | 358/335 |
| 5,040,006 | 8/1991 | Matsumura et al. | 354/267.1 |
| 5,043,816 | 8/1991 | Nakano et al. | 358/906 |
| 5,057,925 | 10/1991 | Tsutsui et al. | 358/906 |

FOREIGN PATENT DOCUMENTS 2916387  10/1979  Germany .

Primary Examiner—Tommy P. Chin
Assistant Examiner—Khoi Truong
Attorney, Agent, or Firm—Robin, Blecker, Daley & Driscoll

[57] ABSTRACT

A video signal recording apparatus for recording of a still-image signal on a recording medium can be set to an interval recording mode for recording a still-image signal at intervals of a predetermined time interval. First time data relative to a recording time according to the amount of information of the still-image signal for one picture is compared with second time data relative to the predetermined time interval. If the first time data is greater than the second time data, a notice to that effect is given for the purpose of preventing an operation error. In addition, a similar advantage can be achieved by displaying the first time data. Also, if the first time data is greater than the second time data, the apparatus is disabled from being set to the interval recording mode.

13 Claims, 4 Drawing Sheets

VIDEO SIGNAL RECORDING APPARATUS WITH INTERVAL RECORDING MODE

This is a continuation application under 37 CFR 1.62 of prior application Ser. No. 08/267,835, filed Jun. 28, 1994, now abandoned, which is a continuation of prior application of Ser. No. 07/892,285 filed Jun. 2, 1992 abandoned.

BACKGROUND OF THE INVENTION

1. Field of the Invention

The present invention relates generally to a video signal recording apparatus and, more particularly, to a video signal recording apparatus having an interval recording mode for recording a predetermined amount of video signal at predetermined time intervals.

2. Description of the Related Art

In recent years, a demand for high-density recording has been increasing in the field of magnetic recording. To meet such a demand, there is provided, for example, a video tape recorder (VTR) of the type which is capable of effecting magnetic recording of high density by transporting a magnetic tape at a reduced speed. However, a VTR provided with a fixed head for recording an audio signal has the disadvantage that if an audio signal is recorded while simply transporting a magnetic tape at a reduced speed, no large relative speed is obtained between the head and the tape and the quality of reproduced sound is degraded. For this reason, a method has been adopted in which the length of each track scanned by a rotary head is extended with respect to the track length used in the conventional art and a PCM audio signal which is compressed along its time axis is sequentially recorded in the additional portion of each extended track.

By way of example, such a method will be explained with reference to a VTR of the rotary 2-head helical scan type. As shown in FIG. 1, a magnetic tape 31 is wrapped around a rotary cylinder 32 through an angle of (180+θ) degrees or more. As shown in FIG. 2, each track includes a video signal recording area 34 corresponding to the rotation of the rotary cylinder 32 through 180 degrees and a PCM audio signal recording area 33 corresponding to the rotation of the rotary cylinder 32 through θ degrees. Rotary heads 30A and 30B alternately trace successive tracks to record a PCM audio signal which is compressed along its time axis in the PCM audio signal recording area 33 of each track as well as a video signal for one field per track in the video signal recording area 34 of each track.

A method of recording a digital signal representative of a still image in a digital signal recording area instead of such a PCM audio signal has been proposed as an applied example of the aforesaid method of recording a digital signal in one area while recording a video signal in another area. Since the amount of information of a still image is comparatively small, it is possible to record the entire still-image information on a magnetic tape by using the PCM audio signal recording areas of a plurality of tracks. According to this method, not only is it possible to realize still-image photography utilizing a photographic apparatus and a recording medium which are identical to those used for motion-image photography, but it is also possible to record and/or reproduce a high-quality still image. The quality of the still image reproduced by this method is higher than that of a still image obtainable by repeatedly reproducing a video signal from the same track on a magnetic tape in a VTR while keeping the magnetic tape in a stopped state.

It is also known that a camera-integrated VTR has been proposed which is composed of such a recording device and a camera and which is capable of recording not only a motion image but also a still image.

If a still image is recorded in the above-described manner, the time required to record one still image will change variously due to conditions such as the sampling frequency at which a video signal is sampled, the number of bits for quantization, the rate of information compression by a high-efficiency encoding circuit, recording density, and the kind of still image, i.e., whether a frame image or a field image. As will be described later, the time required to record one still image changes between 0.5 seconds and 11.1 seconds.

As is known, camera-integrated VTRs having interval photography modes are provided as manufactured products. The interval photography mode is a mode in which a video signal for a predetermined time, for example, a fraction of a second to several seconds is recorded at predetermined time intervals, for example, at intervals of several seconds to several minutes. In general, a manufactured-product version of such a camera-integrated VTR is arranged in such a manner that the aforesaid predetermined time interval (photography interval) or the aforesaid predetermined time (photography time) can be arbitrarily selected from a plurality of set values.

SUMMARY OF THE INVENTION

It is, therefore, an object of the present invention to provide a video signal recording apparatus in which it is possible to compatibly realize an interval photography function and a still-image recording function which deals with a still image whose recording requires several seconds.

To achieve the above object, in accordance with one aspect of the present invention, there is provided a video signal recording apparatus which comprises still image forming means for generating a still-image signal, recording means for recording the still-image signal on a recording medium, first setting means for setting an amount of information of the still-image signal for one picture and outputting first time data relative to a recording time which is required for said recording means to record the still-image signal for one picture according to the amount of information, controlling means for setting the apparatus to an interval recording mode in which said recording means records the still-image signal at intervals of a predetermined time interval, second setting means for setting the predetermined time interval and outputting second time data relative to the predetermined time interval, comparing means for comparing the first time data with the second time data, and notifying means for receiving an output from said comparing means and, if the first time data is greater than the second time data, giving a notice to that effect.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of the present invention will be described below in detail with reference to the accompanying drawings.

Figure 3:
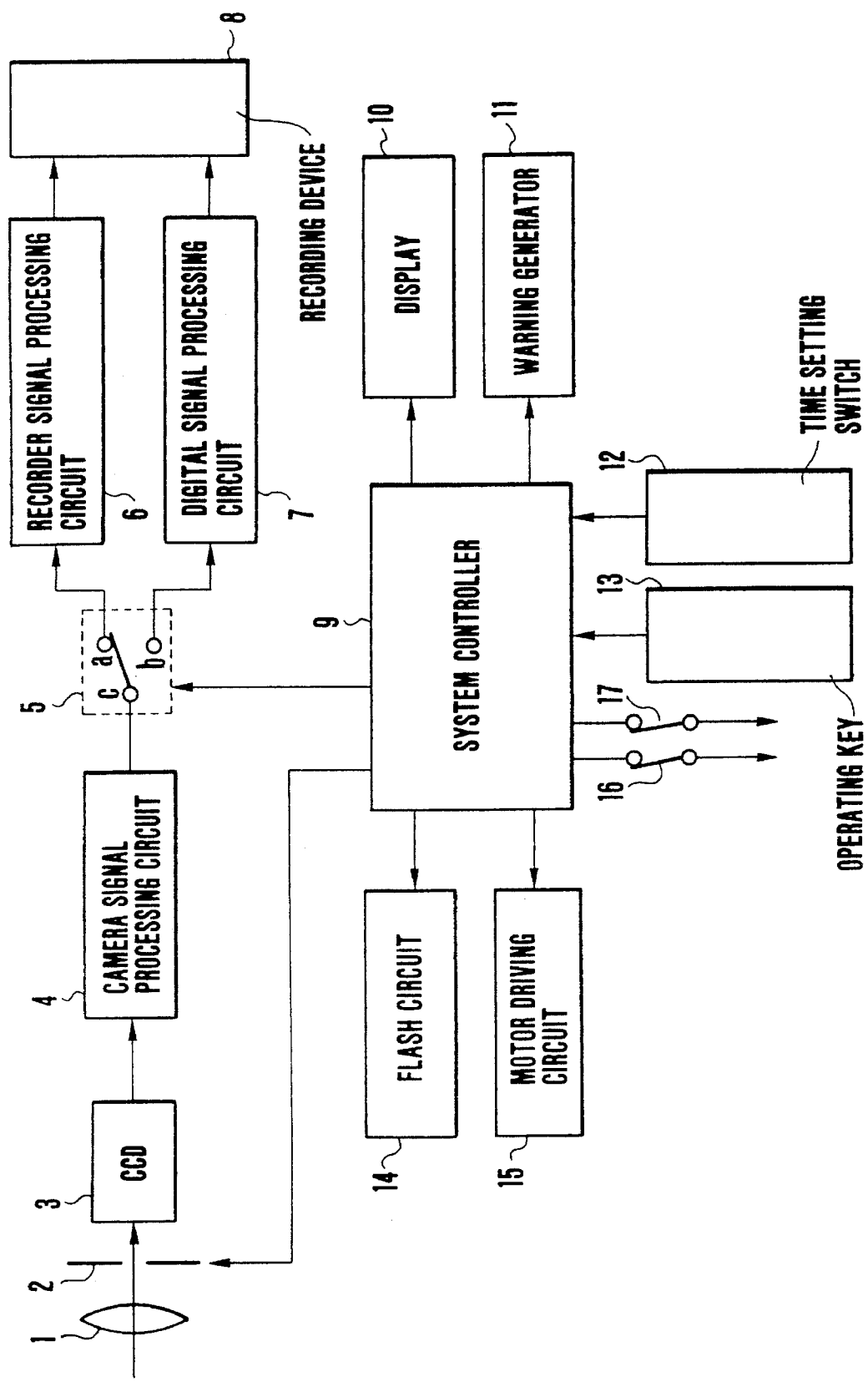
FIG. 3 is a schematic block diagram showing the construction of a VTR according to an embodiment of the present invention.

FIG. 3 is a schematic block diagram showing the construction of a VTR according to the embodiment of the present invention.

The VTR shown in FIG. 3 includes a lens 1, a charge-coupled device (CCD) 3 for photoelectrical conversion of light passed through the lens 1, a shutter 2 disposed between the lens 1 and the CCD 3 for controlling the amount of light incident from a subject, and a camera signal processing circuit 4 for processing a signal supplied from the CCD 3 and converting it into a video signal which conforms to a television signal.

Figure 1:
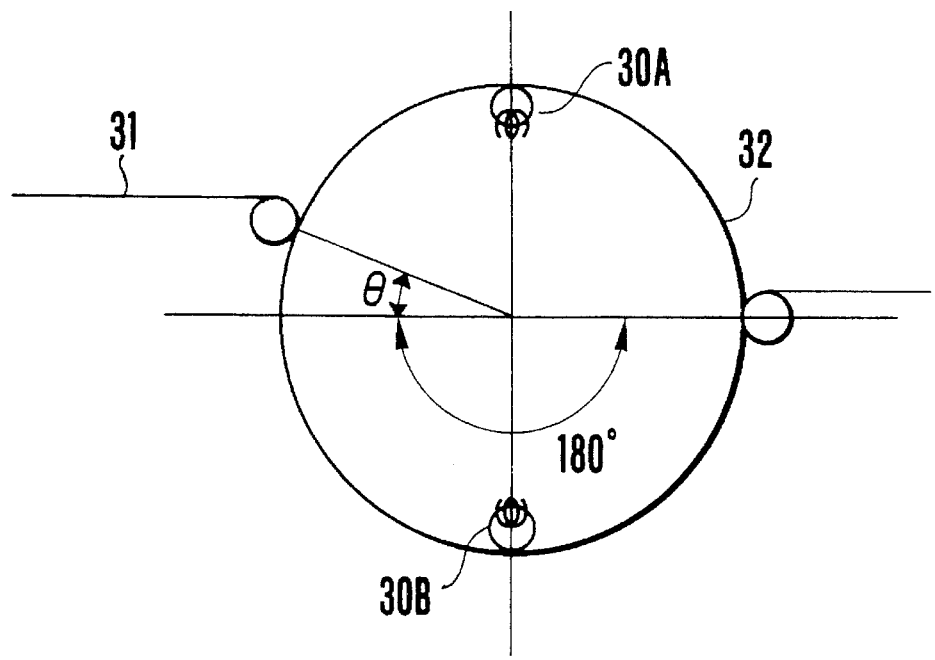
FIG. 1 is a schematic view diagrammatically showing the relation between a rotary head cylinder and a magnetic tape in a rotary 2-head helical scan VTR having a tape wrapping angle containing a PCM signal recording zone.
Figure 2:
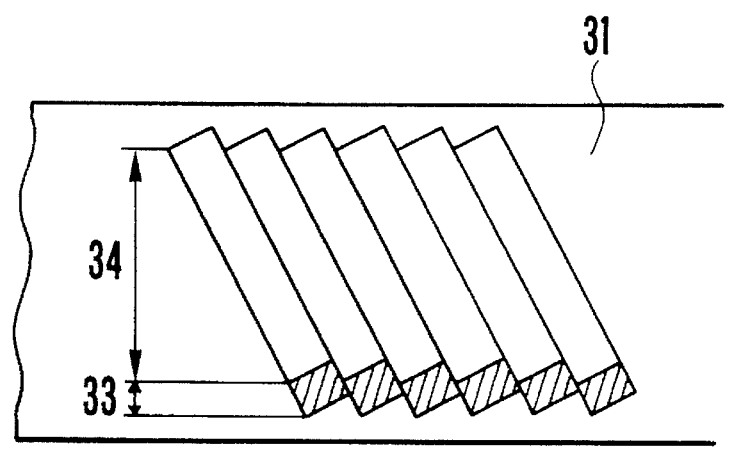
FIG. 2 is a schematic view diagrammatically showing a recording format in which the magnetic tape is recorded by the magnetic heads shown in FIG. 1.

The VTR shown in FIG. 3 also includes a recording-mode selecting switch 5 for setting the apparatus to either one of motion-image and still-image modes, a recorder signal processing circuit 6 for converting in real time a video signal obtained through the recording-mode selecting switch 5 during motion-image photography into a signal format suitable for magnetic recording, a digital signal processing circuit 7 for converting into a digital signal a video signal for one field or frame which is obtained through the recording-mode selecting switch 5 during still-image photography, performing conversion for allocating the digital signal among PCM signal recording areas 33 in a plurality of tracks, and outputting the resultant digital recording signal, and a recording device 8 for recording a video signal outputted from the recorder signal processing circuit 6 in a video signal recording area (shown at 34 in FIG. 2) in the form of a motion-image signal, or recording a PCM signal outputted from the digital signal processing circuit 7 in a PCM signal recording area (shown at 33 in FIG. 2) in the form of a still-image signal.

The VTR shown in FIG. 3 also includes a display 10 for displaying the state of a mode, the time required to record a still image, etc., a warning generator 11 for issuing a warning if the time required to record a still image is longer than a time interval for interval photography, a time setting switch 12 for setting a time interval for interval photography, an operating key 13 for selectively setting various modes for still-image recording, a flash circuit 14, a motor driving circuit 15 for controlling the driving of a plurality of motors for driving a magnetic tape, rotary heads and so on, a switch 16 for inputting an instruction to execute interval photography, a release switch 17 for inputting an instruction to execute still-image recording, and a system controller 9 for controlling each part.

Figure 4:
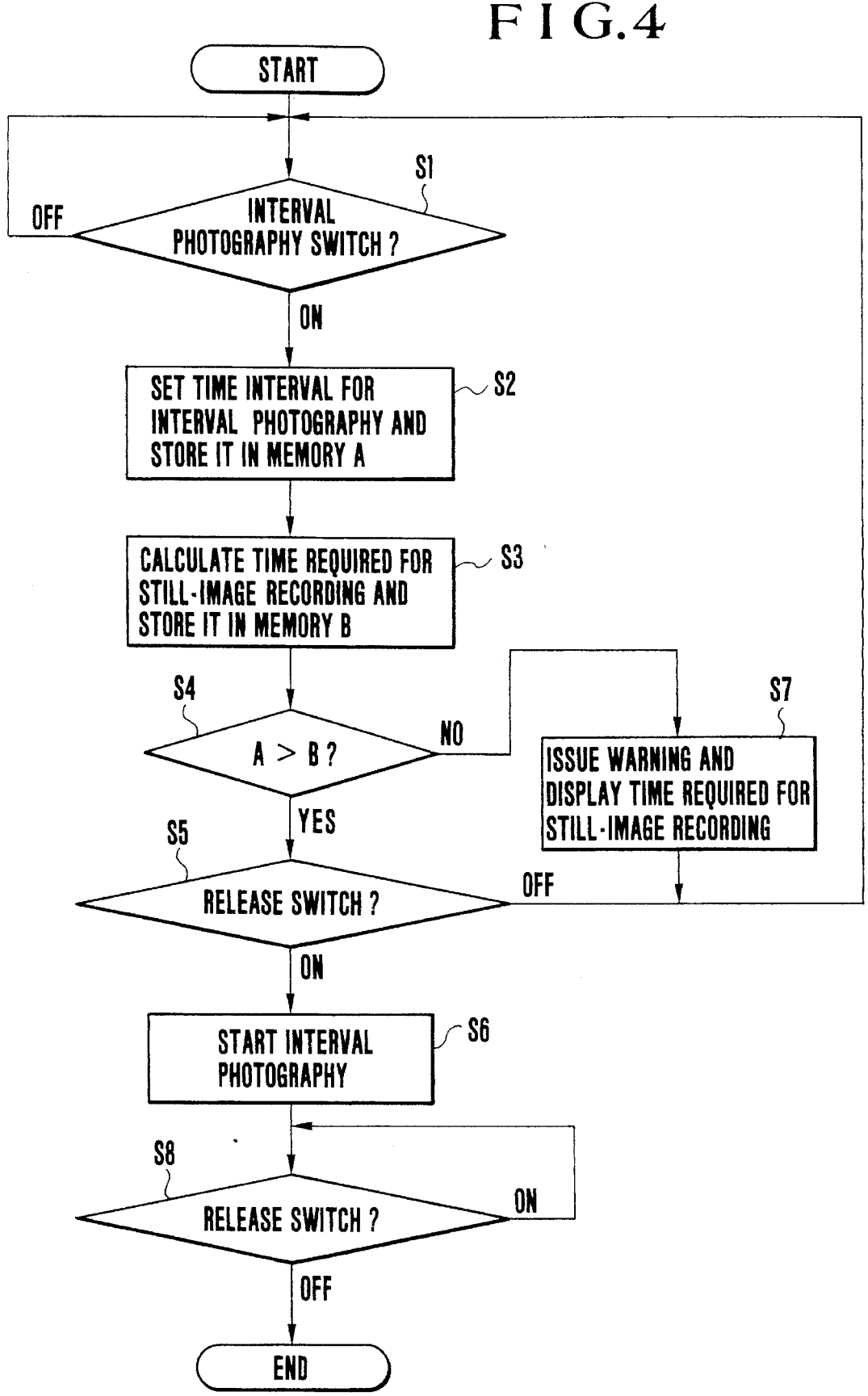
FIG. 4 is a flowchart aided in explaining one example of the operation of interval still-image photography of the VTR of FIG. 3.

FIG. 4 is a flowchart aided in explaining one example of the operation of the system controller 9 of FIG. 3 which is associated with interval still-image photography, and the operation of the VTR of FIG. 3 will be described below with reference to the flowchart.

In Step S1, it is determined whether the interval photography switch 16 is on, and if it is on, the process proceeds to Step S2. In Step S2, the state of setting of the time setting switch 12, that is, a time interval for interval photography inputted by a photographer, is stored in a memory A within the system controller 9.

The time required to record a still image changes variously due to conditions such as a sampling frequency, a band compression method, whether a still image to be recorded consists of one field or one frame, and whether a PCM audio format is a low-density format or a high-density format. A number of times required to record a still image are determined according to various conditions as shown in Table 1, and are stored in a ROM within the system controller 9.

Then, in Step S3, the time required to record a desired still image is read from the ROM and stored in a memory B, and in Step S4, the time interval for interval photography is compared with the time required to record the still image. If it is determined that the time required to record the still image is greater than the time interval for interval photography, the process proceeds to Step S7, where a warning is issued by the warning generator 11 and the time required to record the still image is displayed on the display 10.

If it is determined that the time interval for interval photography is greater than the time required to record the still image, the process proceeds to Step S5. If the release switch 17 is pressed, the process proceeds to Step S6, where interval still-image photography is started under the condition set in Step S3. If the release switch 17 has not been pressed, the process returns to Step S1. If the release switch 17 is turned off during the interval photography, the process passes through Step S8 and is brought to an end.

Figure 5:
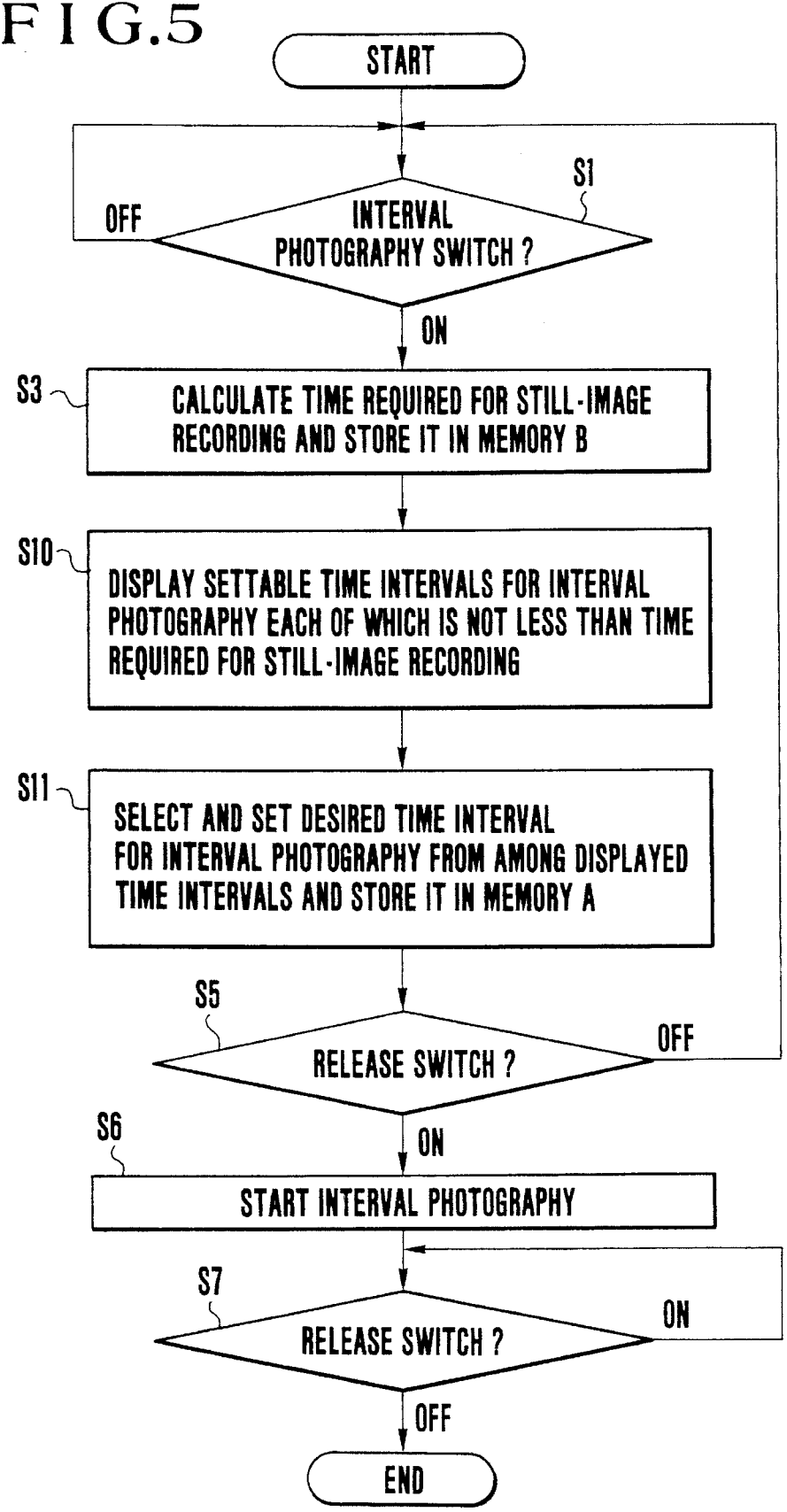
FIG. 5 is a flowchart aided in explaining another example of the operation of interval still-image photography of the VTR of FIG. 3.

FIG. 5 is a flowchart aided in explaining another example of the operation of the system controller 9 which is associated with the interval still-image photography described above in connection with FIG. 4. The above-described example is based on the assumption that it is possible to set a time interval of interval still-image photography shorter than the obtained time required for interval still-image recording. The example which will be described below is arranged so that it is impossible to set, through the time setting switch 12, a time interval for interval still-image photography to a time interval shorter than the obtained required time for interval still-image recording.

More specifically, if the time required to record a particular still image is calculated and is stored in the memory B in Step S3, the process proceeds to Step S10, where the display 10 is made to display only time intervals for interval photography each of which is not less than the time required to record the still image, from among settable time intervals for interval photography. For example, if 1 second, 2 seconds, 5 seconds, 10 seconds, 30 seconds, 1 minute, 2 minutes, 5 minutes, 10 minutes and 30 minutes are prepared as the settable time intervals for interval photography, and if the time required to record the particular still image is calculated as 7.4 seconds, the display 10 provides seven kinds of visual displays indicative of "10 seconds", "30 seconds", "1 minute", "2 minutes", "5 minutes", "10 minutes" and "30 minutes", and does not display "1 second", "2 seconds" nor "5 seconds".

Then, in Step S11, a desired time interval for interval photography is set through the time setting switch 12, but in this example it is impossible to select any time interval other than the time intervals displayed in Step S10.. For example, the time setting switch 12 may be made up of a plus key, a minus key and a set key, and if one of the displayed time intervals is selected by means of the plus key or the minus key, the selected time interval is made to blink. The time interval which is blinking is stored in the memory A by operating the set key.

Finally, Table 1 will be described in brief.

TABLE 1

| SAMPLING FREQUENCY | BAND COMPRESSION METHOD | FIELD OR FRAME | TIME REQUIRED TO RECORD STILL IMAGE (SEC) | |
|---|---|---|---|---|
| | | | LOW DENSITY | HIGH DENSITY |
| 1365 fH (6 fsc) | ADRC | FRAME | 11.1 | 3.6 |
| | | FIELD | 6.6 | 2.2 |
| | ADRC SUB-SAMPLING | FRAME | 3.9 | 1.3 |
| | | FIELD | 2.5 | 0.8 |
| 910 fH (4 fsc) | ADRC | FRAME | 7.4 | 2.4 |
| | | FIELD | 4.4 | 1.4 |
| | ADRC SUB-PLING | FRAME | 2.6 | 0.8 |
| | | FIELD | 1.7 | 0.5 |

As shown in Table 1, a sampling frequency can be selected from two kinds of frequencies: 910 fH (4 fsc) and 1365 fH (6 fsc), and a compression method can be selected from two kinds of modes: a high-image-quality mode in which priority is given to image quality and a high-compression-rate mode in which priority is given to recording time. The high-image-quality mode uses an ADRC method, while the high-compression-rate mode uses an ADRC+ subsampling method. The word "FIELD" or "FRAME" indicates whether a still image consisting of a signal for one field or a still image consisting of a signal for one frame is to be recorded. Low-density recording and high-density recording differ from each other in recording wavelength. The unit of the time required to record a still image for each condition is the second.

As is apparent from the foregoing description, in accordance with the present embodiment, there is provided a video signal recording apparatus in which it is possible to compatibly realize an interval photography function and a still-image recording function.

What is claimed is:

1. A video signal recording apparatus comprising:
   (a) still image forming means for generating a still-image signal;
   (b) recording means for recording the still-image signal on a recording medium;
   (c) first setting means for setting a recording period which is required for said recording means to record the still-image signal for one picture and for outputting first time data representing the recording period;
   (d) controlling means responsive to input to said apparatus for interval still image recording for setting said apparatus to an interval recording mode in which said recording means records the still-image signal for the recording period at intervals of a predetermined time interval;
   (e) second setting means for manually setting the predetermined time interval independent of the recording period and outputting second time data relative to the predetermined time interval;
   (f) comparing means for comparing the first time data with the second time data; and
   (g) notifying means for receiving an output from said comparing means and, if the first time data is greater than the second time data, then providing output notification to a user of said apparatus.

2. An apparatus according to claim 1, wherein said notifying means includes display means for providing, if the first time data is greater than the second time data, visual display indicative of that fact.

3. An apparatus according to claim 1, further comprising display means for displaying the first time data.

4. An apparatus according to claim 1, wherein said controlling means is disabled from setting said apparatus to the interval recording mode if the first time data is greater than the second time data.

5. An apparatus according to claim 1, wherein said second setting means selects one time interval from among a plurality of different time intervals to set the selected time interval as the predetermined time interval.

6. An apparatus according to claim 5, further comprising display means for receiving the first time data and displaying, from among the plurality of different time intervals, only the second time data relative to time intervals longer than the recording time indicated by the first time data.

7. An apparatus according to claim 1, wherein said recording means includes a rotary head for tracing a tape-shaped recording medium which serves as the recording medium, said rotary head recording the still-image signal while forming a multiplicity of parallel tracks on the tape-shaped recording medium.

8. An apparatus according to claim 7, further comprising motion-image forming means for forming a motion-image signal, and wherein said rotary head records the motion-image signal in a first area of each of the multiplicity of tracks and the still-image signal in a second area thereof.

9. A video signal recording apparatus comprising:
   (a) still image forming means for generating a still-image signal;
   (b) recording means for recording the still-image signal on a recording medium;
   (c) first setting means for setting a recording period which is required for said recording means to record the still-image signal for one picture and for outputting first time data representing the recording period;
   (d) controlling means responsive to input to said apparatus for interval still image recording for setting said apparatus to an interval recording mode in which said recording means records the still-image signal for the recording period at intervals of a predetermined time interval;
   (e) second setting means for manually setting the predetermined time interval independent of the recording period and outputting second time data relative to the predetermined time interval;
   (f) comparing means for comparing the first time data with the second time data; and
   (g) disabling means responsive to said comparing means for disabling said controlling means from setting said apparatus to the interval recording mode if an output of said comparing means indicates that the first time data is greater than the second time data.

10. A video signal recording apparatus comprising:
    (a) still image forming means for generating a still-image signal;
    (b) recording means for recording the still-image signal on a recording medium;

(c) first setting means for setting a recording period which is required for said recording means to record the still-image signal for one picture and for outputting first time data representing the recording period;

(d) controlling means responsive to input to said apparatus for interval still image recording for setting said apparatus to an interval recording mode in which said recording means records the still-image signal for the recording period at intervals of a predetermined time interval;

(e) second setting means for manually selecting one time interval from among a plurality of different time intervals to set the selected time interval as the predetermined time interval independent of the recording period, and outputting second time data relative to the predetermined time interval;

(f) comparing means for comparing the first time data with a plurality of time data corresponding to the plurality of different time intervals; and (g) display means for receiving the first time data and displaying only time data representing some of the plurality of time intervals which are longer than the recording time indicated by the first time data according to outputs of said comparing means.

11. A video signal recording apparatus comprising:

(a) recording means for recording a video signal on a recording medium;

(b) setting means responsive to input to said apparatus for interval recording for setting the apparatus to an interval recording mode in which said recording means records the video signal for a predetermined recording period at intervals of a predetermined time interval;

(c) selection means for selecting the predetermined recording period among a plurality of predetermined periods;

(d) manually operable means for manually selecting the predetermined time interval among a plurality of time intervals independent of the predetermined recording period;

(e) comparing means for comparing the predetermined recording period selected by said selection means with the predetermined time interval selected by said manually operable means; and (f) notifying means for receiving an output from said comparing means and for providing output notification to a user of said apparatus when the predetermined recording period is longer than the predetermined time interval.

12. A video signal recording apparatus comprising:

(a) recording means for recording a video signal on a recording medium;

(b) setting means responsive to input to said apparatus for interval recording for setting the apparatus to an interval recording mode in which said recording means records the video signal for a predetermined recording period at intervals of a predetermined time interval;

(c) selection means for selecting the predetermined recording period among a plurality of predetermined periods;

(d) manually operable means for manually selecting the predetermined time interval among a plurality of time intervals independent of the predetermined recording period;

(e) comparing means for comparing the predetermined recording period selected by said selection means with the predetermined time interval selected by said manually operable means; and (f) inhibiting means for inhibiting said setting means from setting the apparatus to the interval recording mode when an output of said comparing means indicates that the predetermined recording period is longer than the predetermined time interval.

13. A video signal recording apparatus comprising:

(a) recording means for recording a video signal on a recording medium;

(b) setting means responsive to input to said apparatus for interval recording for setting the apparatus to an interval recording mode in which said recording means records the video signal for a predetermined recording period at intervals of a predetermined time interval;

(c) selection means for selecting the predetermined recording period among a plurality of predetermined periods;

(d) manually operable means for manually selecting the predetermined time interval among a plurality of time intervals independent of the predetermined recording period;

(e) comparing means for comparing the predetermined recording period selected by said selection means with the plurality of time intervals; and (f) display means responsive to said comparing means for displaying only time data representing some of the plurality of time intervals which are longer than the recording period selected by said selection means.

* * * * *